United States Patent [19]

Arai

[11] Patent Number: 5,008,685

[45] Date of Patent: Apr. 16, 1991

[54] LASER GENERATOR FOR PRODUCING MODULATING DATA THEREFOR

[75] Inventor: Seiji Arai, Tokyo, Japan

[73] Assignee: Kabushiki Kaisha Toshiba, Kawasaki, Japan

[21] Appl. No.: 299,185

[22] Filed: Jan. 19, 1989

[30] Foreign Application Priority Data

Jan. 22, 1988 [JP] Japan ................................ 63-122841

[51] Int. Cl.[5] ........................... G01D 15/14; B41J 2/47

[52] U.S. Cl. ...................................... 346/108; 346/160

[58] Field of Search ................. 346/108, 76 L, 107 R, 346/160; 358/296, 300, 302

[56] References Cited

U.S. PATENT DOCUMENTS

| | | | |
|---|---|---|---|
| 4,387,983 | 6/1983 | Masegi | 346/160 |
| 4,594,596 | 6/1986 | Takahashi | 346/108 |
| 4,681,424 | 7/1987 | Kantor | 346/160 |

*Primary Examiner*—George H. Miller, Jr.
*Assistant Examiner*—Scott A. Rogers
*Attorney, Agent, or Firm*—Finnegan, Henderson, Farabow, Garrett, and Dunner

[57] ABSTRACT

A laser generating apparatus inputs to a laser scanner as modulating data a signal indicative of the logical sum of serial data corresponding to image information and an arbitrarily delayed version of the serial data. Thus the laser scanner modulates the laser beam in accordance with on and off intervals of the modulating data and irradiates the modulated beam onto a photosensitive body to scan the same. Therefore, changes in the laser exposure width due to fluctuations of the surface potential (mainly, the exposure potential) of the photosensitive body are easily and certainly corrected in accordance with the adjustment of the on and off intervals of the modulating data, namely, the adjustment of the quantity of data delay.

10 Claims, 9 Drawing Sheets

LASER GENERATOR FOR PRODUCING MODULATING DATA THEREFOR

BACKGROUND OF THE INVENTION

1. Field of the Invention

The present invention relates to laser generators and a method of producing modulating data therefor used in laser printers, etc., and more particularly to such generator which provides invariably stabilized exposure light for a photosensitive drum using a simple structure and a method of producing modulating data therefor.

2. Description of the Prior Art

At present, laser printers are applied in various picture information output devices such as digital copying machines and facsimile output devices. FIG. 1 schematically illustrates the relationship between a laser scanner constituting an exposure device and a photosensitive body on which a static latent image is formed by such exposure in a laser printer.

In FIG. 1, reference numerals 10 and 20 denote a laser scanner and a photosensitive body (or drum), respectively. In the laser scanner 10, reference numeral 11 denotes a laser beam emitting element such as a laser diode which emits a laser beam LB, which is reflected by a polygon mirror 12 and then a reflective mirror 13, which constitute part of the laser scanner 10, and irradiated onto the photosensitive drum 20. The polygon mirror 12 is driven by a polygon motor (not shown) to rotate in the direction of the arrow A. The direction of reflection of the laser beam LB by the polygon mirror 12 is sequentially altered in accordance with the rotation of the polygon mirror 12 and the laser beam LB irradiated onto the drum 20 is moved along the axis of the photosensitive drum 20 (as shown by the arrow B in FIG. 1). in this way, the laser beam LB scans the surface of the photosensitive drum 20. Further, if the drum 20 is rotated in the direction of the arrow C and the laser beam LB modulated in accordance with image data is generated by the laser beam emitting element 11, a static latent image corresponding to the image information is formed on the photosensitive surface of the drum 20.

Usually, a photosensor 14 is provided in the vicinity of one end of the photosensitive drum 20 in order to obtain line synchronization in the exposing procedure. In such apparatus, the laser beam emitting element 11 is forced to emit a laser beam at the start of exposure and at the end of exposure for one line. When the photosensor 14 senses this emitted laser beam LB, exposure for a respective one of successive lines is performed using a signal indicative of the detection of the laser beam LB as a horizontal synchronizing signal.

With such conventional laser printer (especially its laser scanner 10), laser modulations are controlled by using image data (serial data corresponding directly to image information) in such a uniform manner that, for example, the laser beam LB is subjected to on control (actually the laser beam LB is emitted and irradiated) when the image data is in the on interval during which the logical level is "1" while the laser beam LB is subjected to off control (the emission of the laser beam LB is stopped or interrupted) when the image data is in the off interval during which the logical level is "0". Therefore, even if, for example, the surface potential (mainly the exposure potential) of the photosensitive drum 20 fluctuates and hence the laser exposure width changes due to changes in the temperature within and aging of the printer, etc., it is usually impossible to compensate for these fluctuations and changes.

SUMMARY OF THE INVENTION

The present invention derives from the contemplation of the above situations. It is an object of the present invention to provide a laser generating apparatus which effectively compensates changes in the laser exposure width and realizes the formation of a stabilized latent image in any case and a method of generating modulating data for a laser beam.

In order to achieve such an object, according to the present invention, the serial data constituting the image data is not intactly used as modulating data for the laser beam, but the logical sum of the serial data and an arbitrarily delayed version of the serial data is used as laser beam modulating data.

Thus, the laser scanner performs the modulation of the laser beam in accordance with the on-off intervals of modulating data produced as the logical sum and irradiates and causes the modulated beam to scan the photosensitive drum. For example, when the laser beam is on controlled corresponding to a black pixel, the on interval is determined by the on interval of the modulating data whose on and off intervals are arbitrarily adjusted in accordance with the quantity of data delay. This means that even if the laser exposure width may be changed due to fluctuations of the surface potential (mainly the exposure potential) of the photosensitive drum, etc., it will be corrected easily and certainly in accordance with the quantity of data delay in the generation of the modulating data.

If such controlled correction of the laser exposure width (control of the quantity of data delay) is performed positively, the density of a recorded image will be adjusted arbitrarily as desired.

DESCRIPTION OF THE PREFERRED EMBODIMENTS

Figure 1:
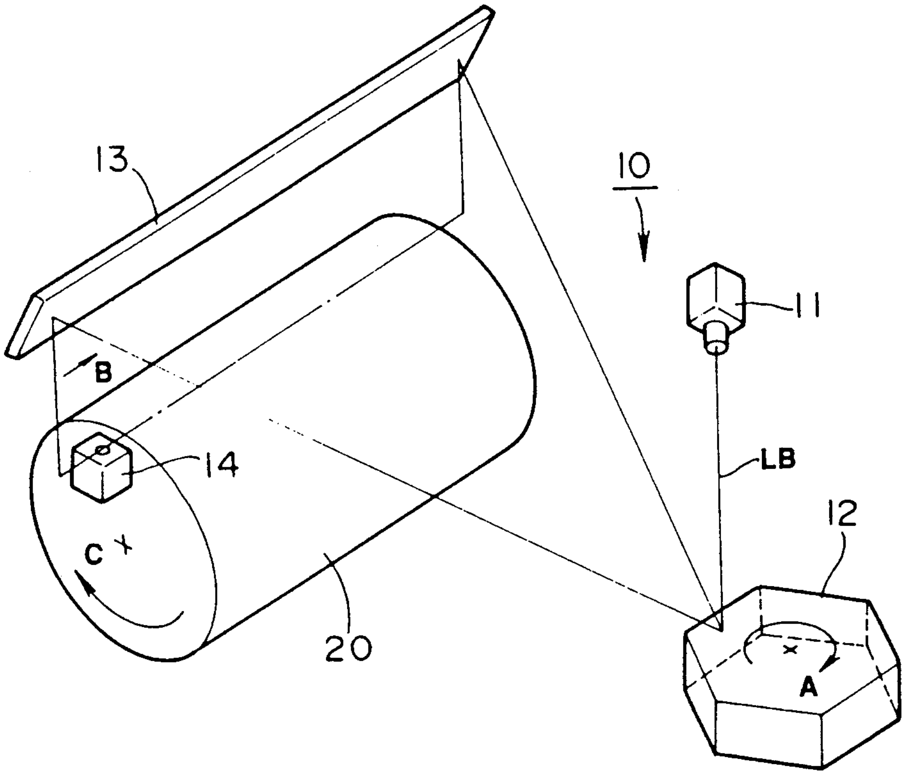
FIG.1 (PRIOR ART)
FIG. 1 is a schematic perspective view of a typical laser scanner and a photosensitive body in a laser printer disposed in a particular positional relationship thereto.
Figure 2:
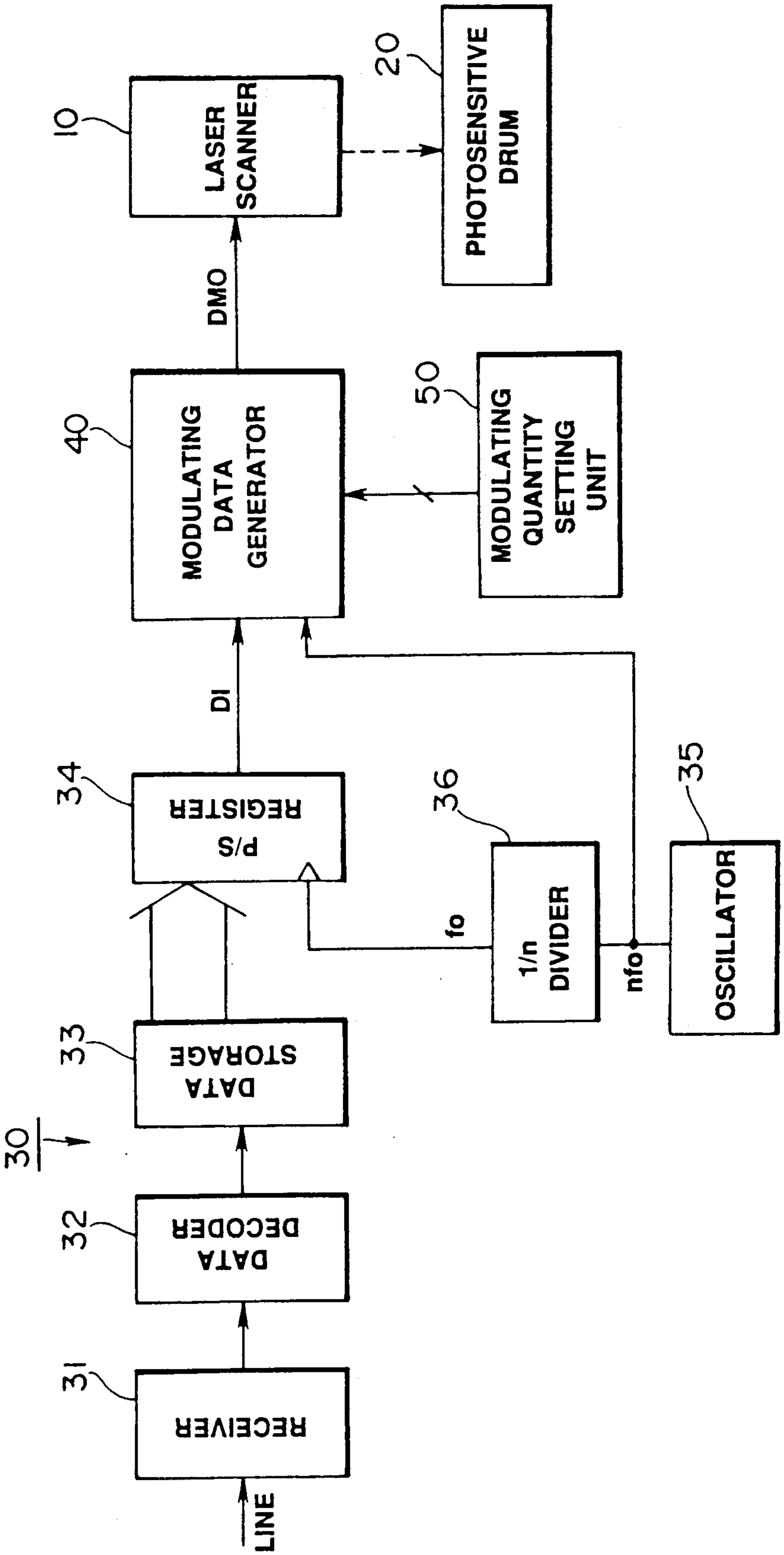
FIG. 2 is a block diagram of an embodiment of a laser generator according to the present invention.

FIG. 2 shows an embodiment of a laser generator according to the present invention applied to a laser printer used as a facsimile output device. As shown in FIG. 2, the laser generator mainly includes an image data generator 30 which generates image data, a modulating data generator 40 which generates modulating data which modulates the laser beam in accordance with image data generated by the image data generator 30 and delivers the modulating data to a laser scanner 10 and a photosensitive drum 20 disposed in a positional relationship such as that shown in FIG. 1, and a modulation quantity setting unit 50 including a switching circuit for variably setting a modulation quantity of the modulating data produced by the modulating data generator 40.

First, the image data generator 30 will be described in which a receiver 31 receives and processes appropriately compressed (encoded) image data incoming through a communication line such as a telephone line and transfers the resulting data to a data decoder 32, which performs a predetermined decoding operation on the transferred coded image data to reproduce the original image data which has, for example, a logical "1" level in correspondence to a black pixel and a logical "0" level in correspondence to a white pixel. The reproduced data is then stored in a data storage 33.

The data storage 33 corresponds to a so-called page memory in such a facsimile output device. Data (image data) for reproduction of an image through the appropriate laser printer is all stored temporarily in the data storage 33. The stored image data is sequentially read out, for example, as 16-bit parallel data in accordance with access by an appropriate memory control means (not shown) and converted sequentially to serial data through a parallel-to-serial (P/S) register 34.

In the parallel-to-serial data conversion in the P/S register 34, a clock signal $f_o$ is used as a data transferring clock which is obtained by dividing by a factor of n in a devider 36 a clock signal $nf_o$ (where n is a natural number) generated by an oscillator 35 and is used to determine one pixel period of a picture recorded by the laser printer.

The resulting serial image data is input as data DI together with the oscillating clock $nf_o$ from the oscillator 35 to the modulating data generator 40. In this connection, the oscillating clock frequency $nf_o$ generated by the oscillator 35 is set to about 8–10 times the transferring clock frequency $f_o$ (for example, to about 50 MHz) and is usually used to synchronize the polygon mirror 12 (in FIG. 1; accurately, a polygon motor (not shown) to drive the polygon mirror).

Figure 3:
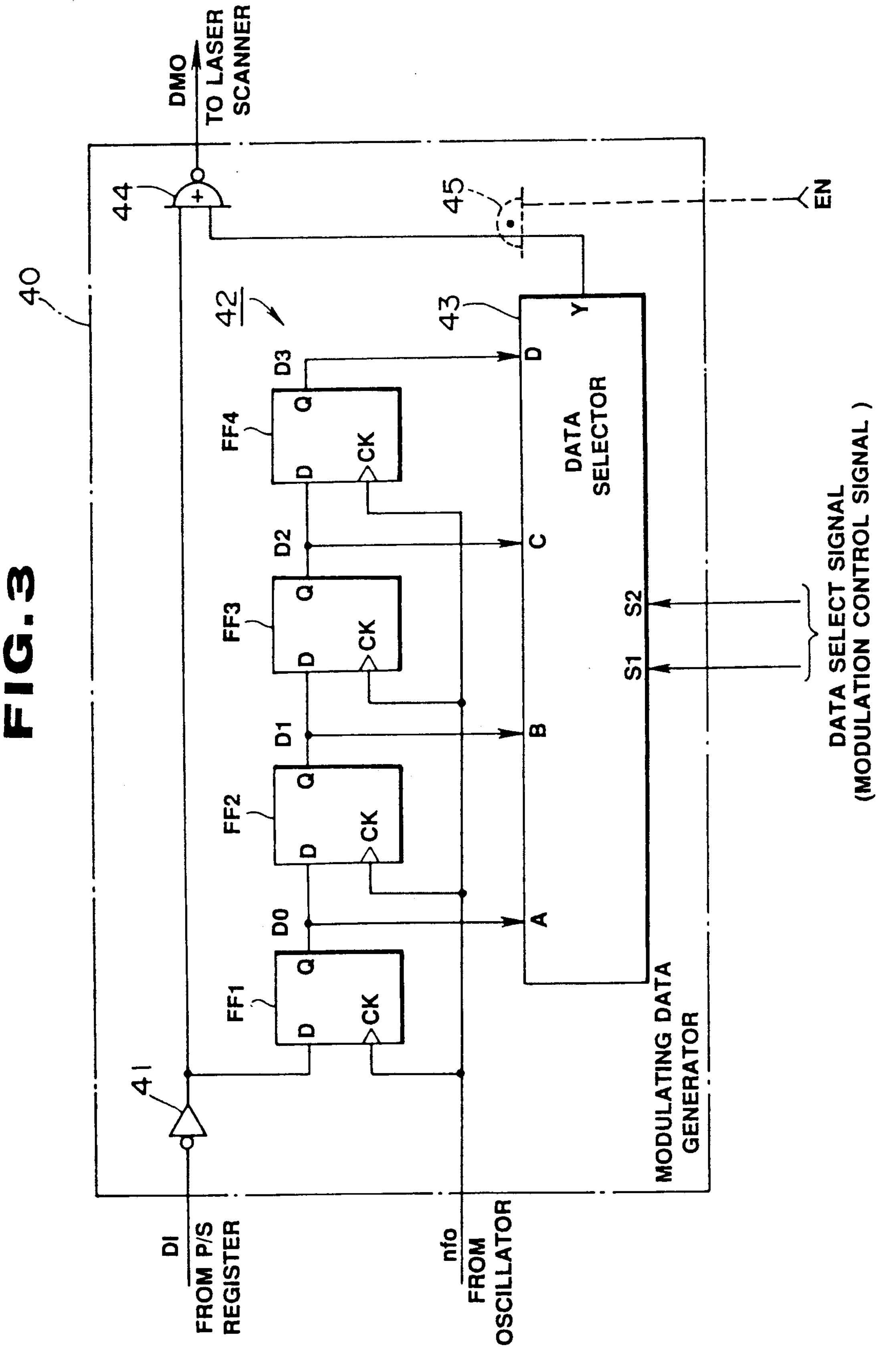
FIG. 3 is a block diagram showing a specific structure of a modulating data generator shown in FIG. 2.

Referring to FIGS. 1 and 2 as well as FIG. 3, the modulating data generator 40 and the modulation quantity setting unit 50 will be described in detail. As shown in FIG. 3, the modulating data generator 40 basically includes an inverter 41, a latch array 42 which comprises D-type flip-flops FF1–FF4, a data selector 43 and a NOR gate 44.

The inverter 41 inverts the logical level of serial input data DI applied through the P/S register 34. The flip-flops FF1–FF4 of the latch array 42 latch signals received at their respective data terminals D when the oscillating clock $nf_o$ generated by the oscillator 35 rises. The data selector 43 selects one of the outputs from the D-type flip-flops FF1–FF4 constituting the latch array 42 in accordance with a 2-bit data select signal (modulation control signal) applied to selection terminals S1 and S2 of the selector 43 from the modulation quantity setting unit 50 and delivers the selected output to the NOR gate 44. If the data select signals applied to the terminals S1 and S2 are both of the logical "0", the data selector 43 selects the output signal DO of the flip-flop FF1 applied to the A input terminal thereof. If the terminal S1 is at the logical "0" level and the terminal S2 is at the logical "1" level, the data selector 43 selects the output signal D1 of the flip-flop FF2 applied to the B input terminal thereof. If the terminal S1 is at the logical "1" level and the terminal S2 is at the logical "0" level, the data selector 43 selects the output signal D2 of the flip-flop FF3 applied to the C input terminal thereof. If terminals S1 and S2 are both at the logical "1" level, the data selector 43 selects the output signal D3 of the flip-flop FF4 applied to the D input terminal thereof.

As will be clear from such structure of the modulating data generator 40, the modulation quantity setting unit 50 is constituted as a circuit which generates the data select signals (modulation control signals), so that it may be, for example, a switching circuit with a binary counter the count of which is changed to thereby change the contents of the data select signal in accordance with an appropriate switching operation by an operator. Such circuit itself is well-known and its illustration will be omitted. In summary, the modulation quantity setting unit 50 should only be a circuit which generates a 2-bit signal which can designate the data selection by the data selector 43 in the manner mentioned above.

Figure 4:
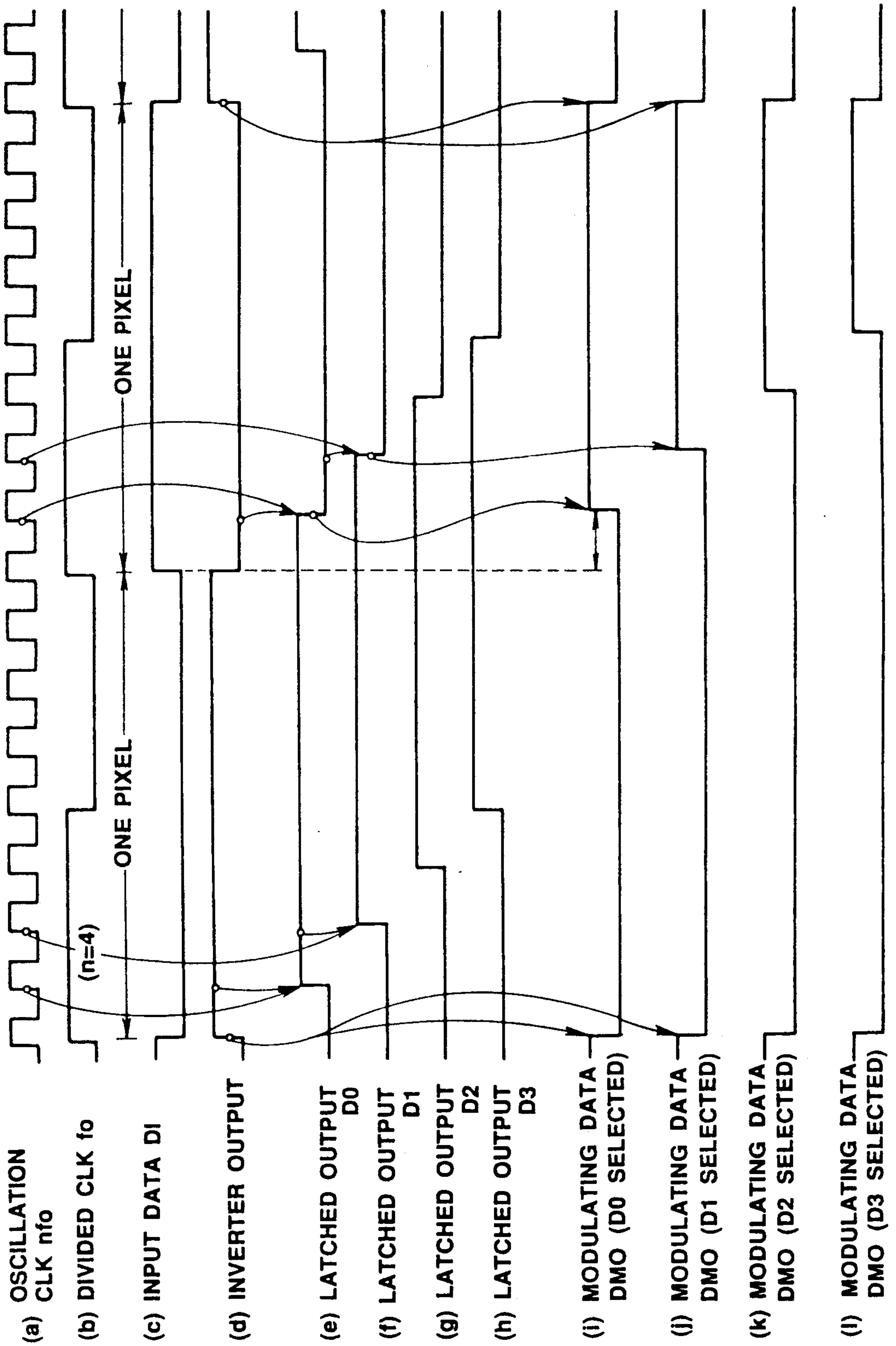
FIG. 4 is a timing chart showing the illustrative operation of the modulating data generator shown in FIG. 3.

FIG. 4 is a timing chart mainly showing the operation of the modulating data generator 40 and the operation of the embodiment will be described which is mainly directed to the modulating data generator 40.

FIG. 4(*a*) shows the aspect of a clock $nf_o$ generated by the oscillator 35, and FIG. 4(*b*) shows the aspect of the data transferring clock $f_o$ obtained by dividing the clock $nf_o$ by a factor of n in the divider 36. For convenience, the divider 36 divides the clock $fn_o$ by 4 (n=4) in the particular embodiment.

The P/S register 34 converts to serial data parallel data supplied from the data storage 33 synchronously with the divided data transferring clock of and outputs the serial data as input data DI to the modulating data generator 40. FIG. 4(*c*) shows the waveform of the input data DI.

The input data DI is subjected to a logical inversion by the inverter 41 of the modulating data generator 40 to become a signal as shown in FIG. 4(*d*). The output from the inverter 41 is delivered to the latch array 42 comprising the D-type flip-flops FF1–FF4 and the NOR gate 44.

In the latch array 42, the output of the inverter 41 and the respective outputs of the preceding D-type flip-flops are sequentially latched in accordance with the above-mentioned respective operations of the flip-flops. For example, the flip-flop FF1 outputs as its latched output DO a signal as shown in FIG. 4(*e*), the flip-flop FF2 outputs as its latched output D1 a signal as shown in FIG. 4(*f*), the flip-flop FF3 outputs as its latched output D2 a signal as shown in FIG. 4(*g*), and the flip-flop FF4 outputs as its latched output D3 a signal as shown in FIG. 4(*h*).

Therefore, assume that, for example, the A input to the data selector 43 is selected in accordance with data select signal (modulation control signal) (the terminals S1 and S2 are both at the logical "0" level). The data selector 43 outputs a latched output DO (FIG. 4(*e*)) from the flip-flop FF1 through the output terminal Y of the data selector 43, and the latched output DO and the output of the inverter 41 (FIG. 4(*d*)) are NORed and output through the NOR gate 44. FIG. 4(*i*) shows the aspect of the NORed output. In this respect, as is clear from the comparison between the input data DI shown in FIG. 4(c) and the output of the NOR gate shown in FIG. 4(i), an off portion of the output signal from the NOR gate 44 is extended by one period of the clock $nf_o$ (see FIG. 4(a)).

The output signal of the NOR gate 44 is input as modulating data DMO to the laser scanner 10, which emits a laser beam LB for the time duration in which the modulating data DMO is on. Therefore, in the above case in which the latched output DO is selected, the time duration in which the laser beam LB is emitted in accordance with the on period of the modulating data DMO is set so as to be shorter by one period of the clock $nf_o$ than the conventional case (the exposure width of the laser beam is narrowed). When the data selector 43 selects the respective latched outputs from the D-type flip-flops FF2–FF4, the modulating data DMO output by the NOR gate 44 are as shown in FIG. 4(j), (k) and (l). As will be clear from FIG. 4(i), (j), (k) and (l), the off intervals of the modulating data DMO are differently extended by the respective latched outputs of the stages of the latch array 42 selected by the data selector 43.

According to the particular embodiment, any desired change of the laser modulation aspect is achieved by a simple digital circuit. Therefore, an optimal laser exposure width can be selected as required in accordance with the capacity of laser beam emission of the laser beam emitting element 11 (FIG. 1) disposed in the laser scanner 10 and the sensitivity of the photosensitive drum 20 (FIG. 1). Therefore, the quality of a picture recorded by the laser printer is maintained at all times at a high quality level. Of course, if the aspect of the laser modulation laser exposure width) is changed positively, the recording density will be also adjusted arbitrarily.

If an AND gate 45 is provided additionally in the modulating data generator 40, as shown by the broken line 2 in FIG. 3, it is possible to control the "active/non-active" operation of the modulating data generator 40 in accordance with the content of an externally applied enable signal EN. if the modulation data generator 40 is controlled so as to be "non-active" (the enable signal EN is at the logical "0" level), the laser scanner 10 intactly uses the serial image data (the input data DI to the modulating data generator 40) as the modulating data DO to perform the laser modulation mentioned above.

While the modulating data generator 40 shown in FIG. 3 generates modulating data DMO having an extended off interval compared to the input data DI thereof, data having an extended on interval may be produced conversely. A modulating data generator which will produce such data is shown by 40' in FIG. 5. The modulating data generator 40' includes a version of the modulating data generator 40 shown in FIG. 3, which version lacks the inverter 41 and includes an OR gate 46 in place of the NOR gate 44. The illustrative operation of the generator 40' is shown in FIG. 6 which corresponds to FIG. 4. As will be clear especially from FIG. 6(h)–6(k), the modulating data generator 40' can also set at a variable value the ratio of on to off intervals of the modulating data DMO. Especially, in the modulating data generator 40', the respective on intervals of the modulated data DMO are differently extended in accordance with the respective latched outputs from the stages of the latch array 42 selected by the data selector 43. Therefore, in this case, the exposure width of the laser beam exposing the photosensitive drum 20 through the laser scanner 10 is expanded in accordance with the extended on interval of the modulated data DMO.

Figure 5:
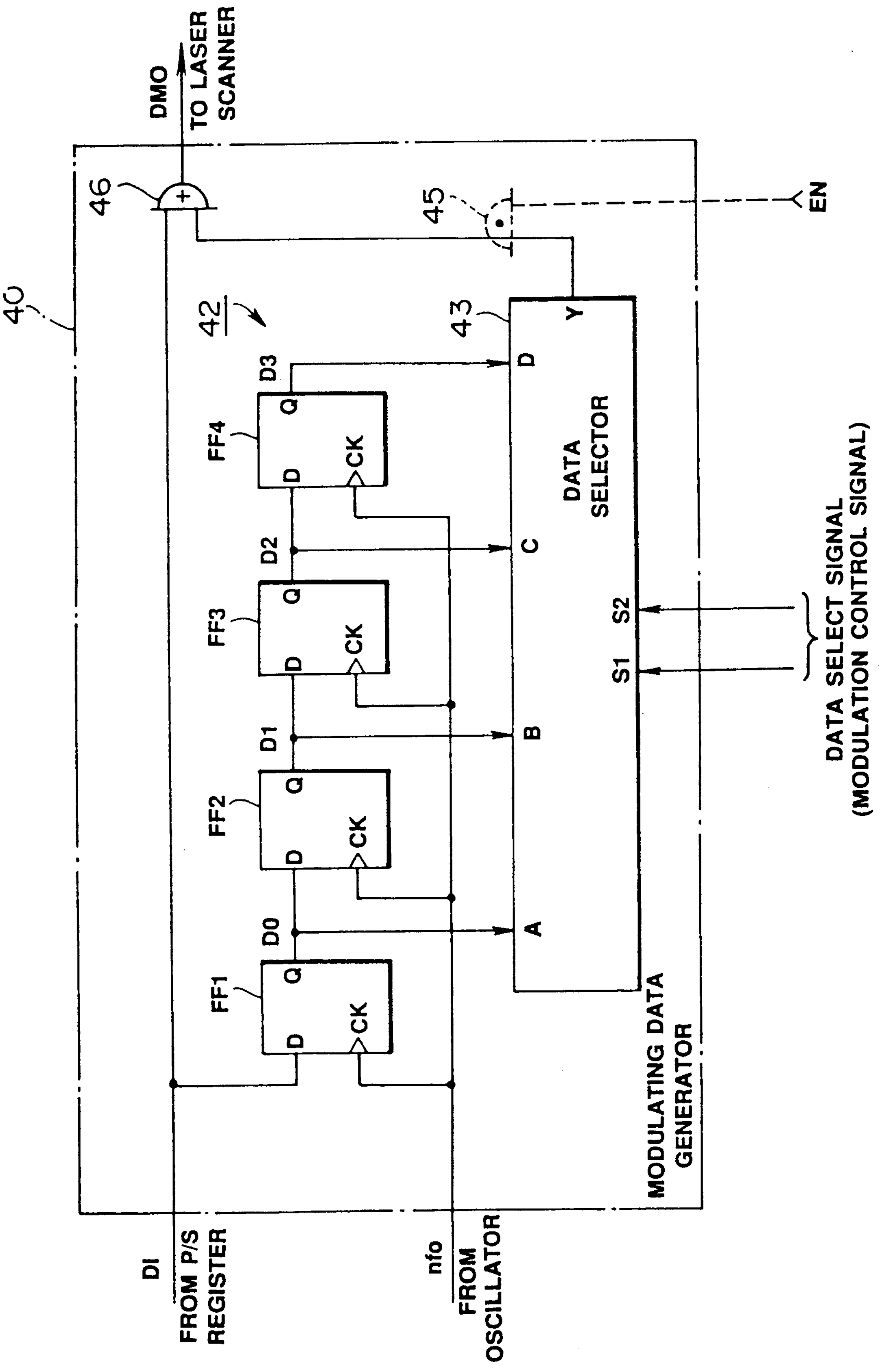
FIG. 5 is a block diagram of an alternative to the modulating data generator of FIG. 2.
Figure 6:
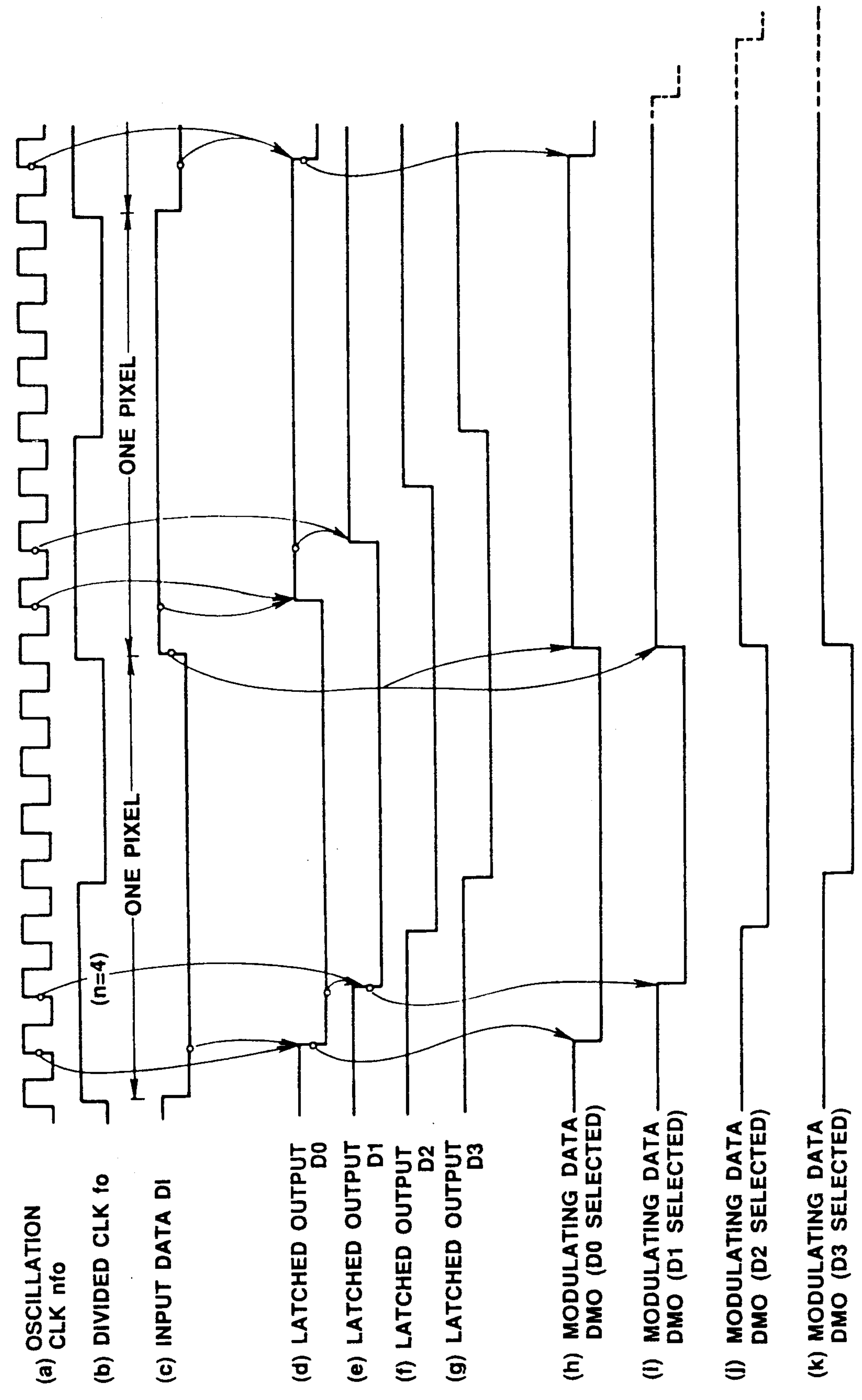
FIG. 6 is a timing chart showing the illustrative operation of the modulating data generator shown in FIG. 5.
Figure 7:
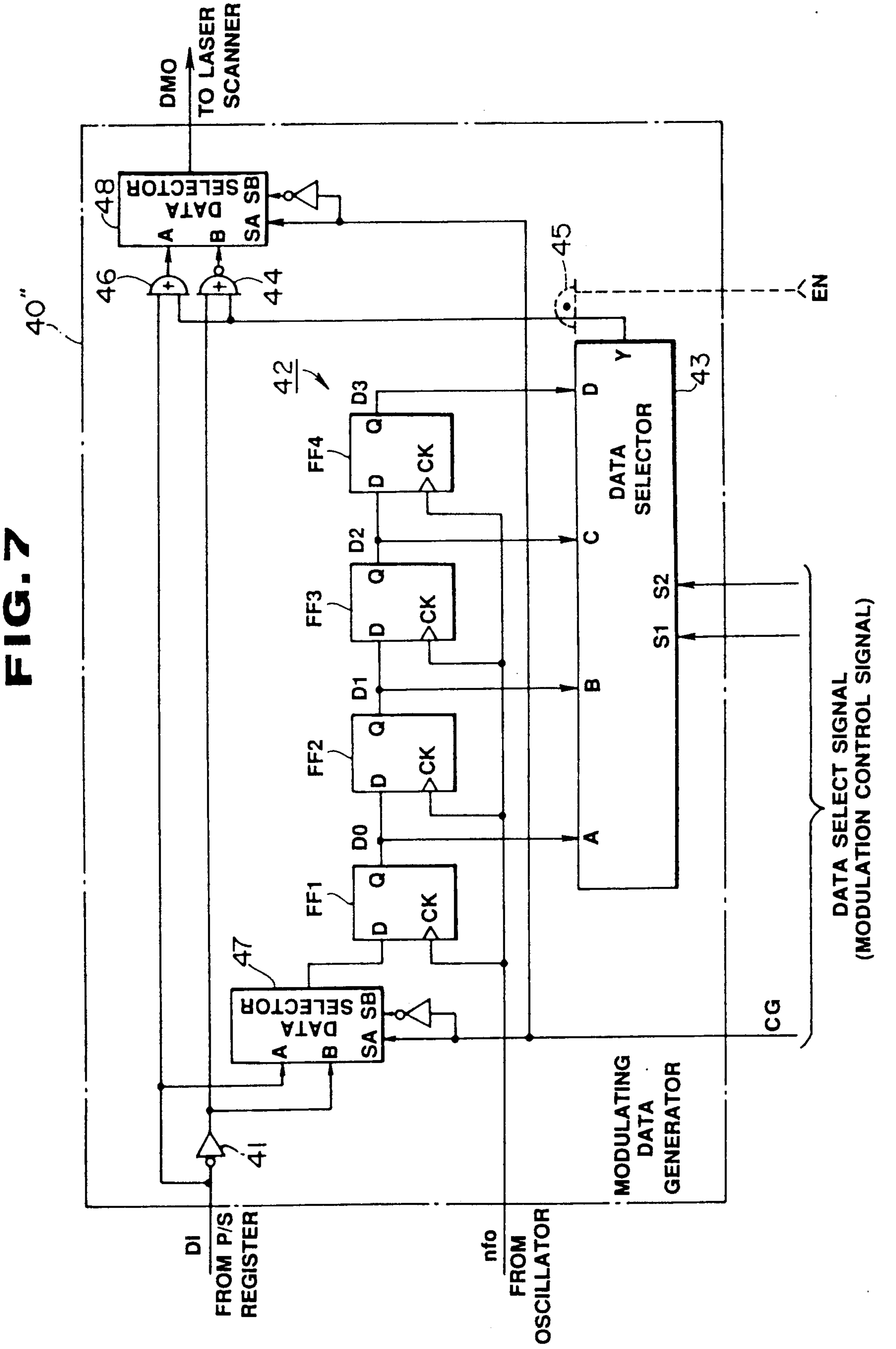
FIG. 7 is a block diagram of a further alternative to the modulating data generator shown in FIG. 2.

FIG. 7 illustrates a structure in which the modulating data generator 40 shown in FIG. 3 and the modulating data generator 40' shown in FIG. 5 are combined so as to jointly use a latch array 42 and a data selector 43.

in more detail, the modulating data generator 40" shown in FIG. 7 includes a data selector 47 which selects one of the input data DI and a logically inverted version of the input data DI from the inverter 41 in accordance with the contents of the switching control signal CG and outputs the selected data to the latch array 42, and a second data selector 48 which selects one of the output of the OR gate 46 as the output of the modulating data generator 40' and the output of the NOR gate 44 as the output of the modulating data generator 40 in accordance with the contents of the switching control signal CG and uses the selected data as the modulating data DMO generated by the modulating data generator 40". If the respective A inputs of the data selectors 47 and 48 are selected in accordance with the switching control signal CG, the modulating data generator 40" operates as the modulating data generator 40' as shown in FIG. 5 while if the respective B inputs of the data selectors 47 and 48 are selected in accordance with the switching control signal CG, the modulating data generator 40" operates as the modulating data generator 40 shown in FIG. 3.

According to such structure of the modulating data generator 40", control of extension of both the on and off intervals of the output modulated data signal DMO is realized, for example, by a 3-bit data select signal (a modulation control signal) comprising the switching control signal CG of the most significant bit and the data select signal of the remaining two bits supplied to the data selector 43.

in the modulating data generator 40" shown in FIG. 7, the respective flip-flops FF1–FF4 constituting the latch array 42 are preferably controlled together to he in a reset state temporarily in response to each switching of the contents of the switching control signal CG for the sake of the common use of the latch array 42 in the two different operations. Thus the two different operations are smoothly switched therebetween.

While any of the illustrated modulating data generators is shown as including "4" D-type flip-flops constituting the latch array 42 for convenience of explanation, the number of flip-flops used may be selected arbitrarily. The number of bits of the data select signal applied to the data selector 43 is determined automatically in accordance with the number of stages of the latch array 42.

Figure 8:
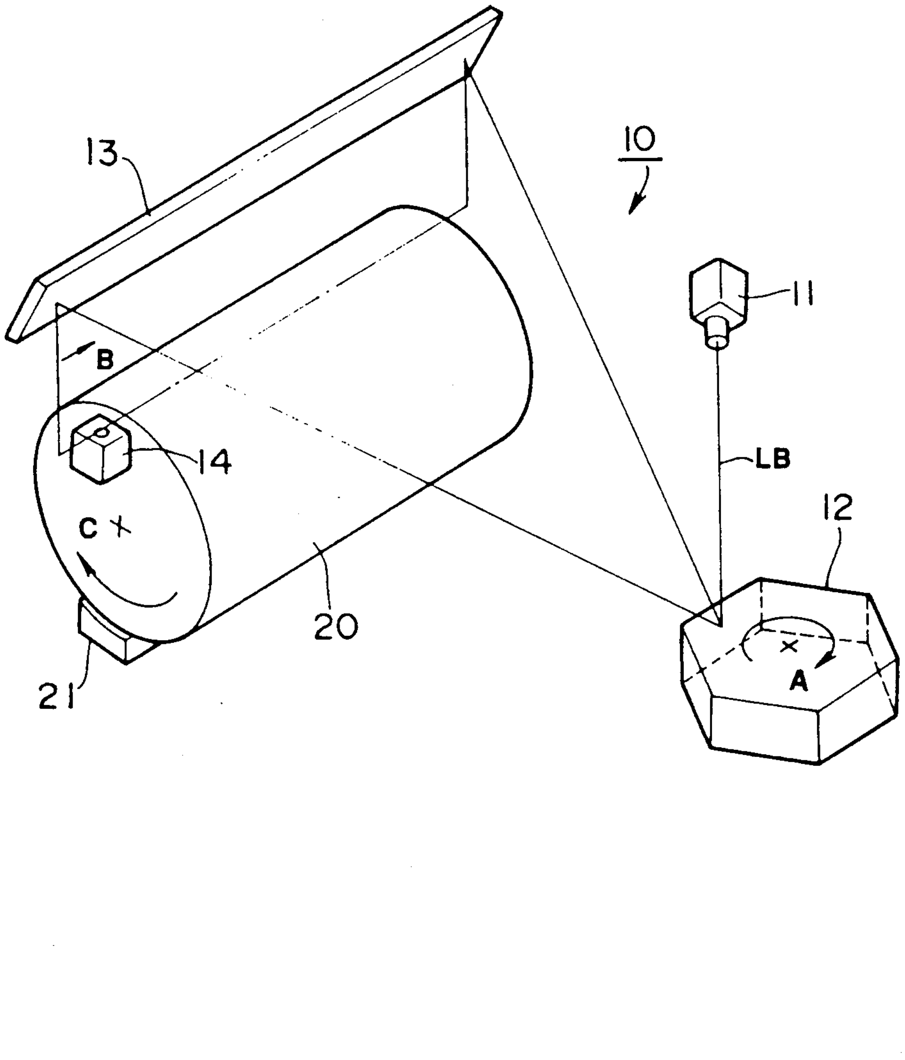
FIG. 8 is a schematic perspective view of a photosensitive body and its peripheral elements in another embodiment of the laser generator according to the present invention.
Figure 9:
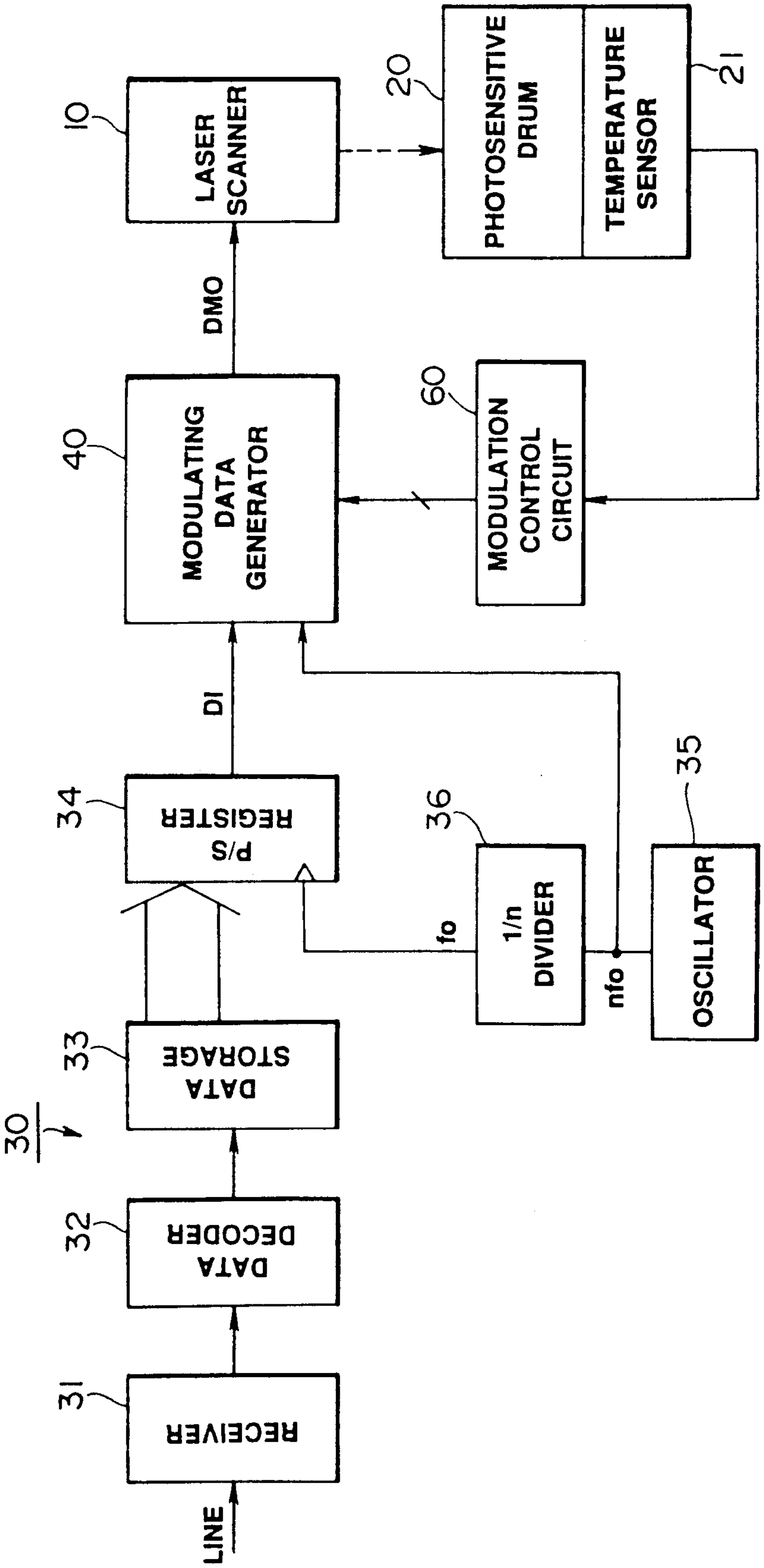
FIG. 9 is a block diagram of a still further embodiment of the laser generator according to the present invention associated with the structure of FIG. 8.

FIGS. 8 and 9 illustrate another embodiment of the laser generator according to the present invention. Also in this particular embodiment, it is presumed that the laser generator according to the present invention is applied in a laser printer used as the facsimile output device. In FIGS. 8 and 9, the same reference numeral is used to denote the same element as that in FIGS. 1 and 2 and a duplicate description thereof will be omitted.

It is generally known that the surface potential (especially the exposure potential due to the laser beam LB) of the photosensitive body (photosensitive drum) 20 greatly changes in accordance with its ambient temperature. For example, if the ambient temperature is lowered, the exposure potential is also lowered. In an extreme case, even if the laser output from the laser scanner 10 is maintained constant, the required laser exposure width on the photosensitive body 20 may not be ensured.

In order to cope with this problem, in the particular embodiment, as shown in FIGS. 8 and 9, a temperature sensor 21 is provided in the vicinity of the photosensitive drum 20 to sense its ambient temperature such that the contents of the data select signal (modulation control signal) applied to the modulating data generator 40 (accurately, its data selector 43) are automatically controlled in accordance with the sensed temperature data.

In more detail, the modulation control circuit 60 shown in FIG. 9 analyses the temperature data sensed by the temperature sensor 21 to rank the data appropriately. If the data is, for example, low-ranked data indicative of a low temperature, the modulation control circuit 60 forms a data select signal (modulation control signal) such that latched data is selected in such a manner that the on interval of the modulating data generated by the modulating data generator 40 is extended, and applies the data select signal to the modulating data generator 40 while if the sensed temperature data is high-ranked data indicative of a high temperature, the modulation control circuit 60 forms a data select signal such that latched data is selected in such a manner that the off interval of the modulating data generated by the modulating data generator 40 is extended, and applies the data select signal to the modulating data generator 40. While in such case the modulating data generator 40 used may be any one of the circuits shown in FIGS. 3, 5 and 7, the number of ranks of the temperature data is preferably set in accordance with the number of changeable modulating data generated by the modulating data generator employed, namely, the number of stages of the latch array 42. For example, in the above embodiment, if the modulating data generator 40 or 40' shown in FIG. 3 or 5 is employed in the above embodiment, the number of ranks of temperature data is preferably set to "4" ("5" including the nonactive state of the appropriate modulating data generator if the AND gate 45 is added). If the modulating data generator 40'' shown in FIG. 7 is employed, the number of ranks of temperature data is preferably set to "8" ("9" including the non-active state of the modulating data generator 40'' if the AND gate 45 is added). The on and off intervals of the modulated data DMO should be controlled stepwise in accordance with the ranks of these temperature data.

According to the particular embodiment, a preferred laser exposure width is automatically maintained invariably and the quality of a recorded picture is maintained in a good state even if the laser printer is placed in whatever ambient conditions. The modulation control circuit 60 may be easily constituted using a microcomputer and well-known digital circuit techniques.

While the embodiment shown in FIGS. 8 and 9 is shown as automatically adjusting the laser exposure width in accordance with the ambient temperature of the photosensitive drum 20 using the temperature sensor 21, another embodiment can, of course, adjust the laser exposure width automatically in accordance with the surface potential of the photosensitive drum 20 sensed by a potential sensor.

While in the respective embodiments it is assumed that the laser generator according to the present invention is applied in the laser printer used as the facsimile output device, the laser generator and a modulating data generating method therefor according to the present invention may be similarly applicable to any type of laser printer in any other application, of course. In this respect, if the laser printer is used in a digital copying machine, the image data read by an original document reader will be directly stored in the data storage 33 (FIG. 2 or 9).

What is claimed is:

1. A laser generating apparatus comprising:

means for generating serial data corresponding to image information in accordance with an appropriate data transferring clock, the data transferring clock having a frequency;

means for generating a clock signal having a frequency which is n times that of the frequency of the data transferring clock where n is a natural number;

modulating data generating means for delaying the serial data by a desired quantity in accordance with the generated clock signal and for outputting modulating data indicative of the logical sum of the delayed serial data and the serial data; and laser scanner for receiving the modulating data, for modulating a laser beam in accordance with the received modulating data, and for forming a latent image on a photosensitive body, the latent image corresponding to the image information, by irradiating and scanning the modulated beam onto and over the photosensitive body.

2. A laser generating apparatus according to claim 1, wherein the modulating data generating means comprises:

a latch array for sequentially latching the serial data in accordance with the clock signal;

a data selector for simultaneously receiving respective data outputs from stages of the latch array, and for selecting and outputting one of the received data outputs in accordance with a select signal applied externally thereto; and a logic circuit for outputting as the modulating data an OR combination of the data output selected by the data selector and the serial data.

3. A laser generating apparatus according to claim 1, wherein the modulating data generating means comprises:

means for logically inverting the serial data;

a latch array for sequentially latching the inverted serial data in accordance with the clock signal;

a data selector for simultaneously receiving respective data outputs from stages of the latch array, and for selecting and outputting one of the received data outputs in accordance with a data select signal applied externally thereto; and a logic circuit for outputting as the modulating data a NOR combination of the data output selected by the data selector and the inverted serial data.

4. A laser generating apparatus according to claim 2, wherein the data select signal applied to the data selector is manually set arbitrarily.

5. A laser generating apparatus according to claim 3, wherein the data select signal applied to the data selector is manually set arbitrarily.

6. The laser generating apparatus according to claim 2, further including:

means for sensing a surface potential of the photosensitive body; and modulation control means for determining the data select signal applied to the data selector in accordance with the sensed surface potential.

7. A laser generating apparatus according to claim 3, further including:

means for sensing a surface potential of the photosensitive body; and modulation control means for determining the data select signal applied to the data selector in accordance with the sensed surface potential.

8. A laser generating apparatus according to claim 1, wherein the modulating data generating means comprises:

means for logically inverting the serial data;

a first data selector for simultaneously receiving the serial data and the inverted serial data, and for selecting and outputting one of the received serial data and inverted serial data in accordance with a first data select signal applied externally thereto;

a latch array for sequentially latching the one of the serial data and inverted serial data selected by the first data selector, in accordance with the clock signal;

a second data selector for simultaneously receiving respective data outputs from stages of the latch array, and for selecting and outputting one of the received data outputs in accordance with a second data select signal applied externally thereto;

a first logic circuit for outputting an OR combination of the output selected by the second data selector and the serial data;

a second logic circuit for outputting a NOR combination of the output selected by the second data selector and the inverted serial data;

a third data selector for simultaneously receiving the outputs of the first and second logical circuits, and for selecting and outputting as the modulating data one of the outputs in accordance with the first data select signal.

9. A laser generating apparatus according to claim 8, wherein the first and second data select signals are manually set arbitrarily.

10. A laser generating apparatus according to claim 8, further including:

means for sensing a surface potential of the photosensitive body; and modulation control means for automatically determining the first and second data select signals in accordance with the sensed surface potential.

* * * * *